C. W. STARKER.
GEAR.
APPLICATION FILED APR. 19, 1917.

1,253,294. Patented Jan. 15, 1918.

WITNESSES:
R. J. Fitzgerald
R. D. Brown

INVENTOR
Charles W. Starker.
BY
Wesley G. Carr
ATTORNEY

UNITED STATES PATENT OFFICE.

CHARLES W. STARKER, OF PITTSBURGH, PENNSYLVANIA, ASSIGNOR TO WESTINGHOUSE ELECTRIC & MANUFACTURING COMPANY, A CORPORATION OF PENNSYLVANIA.

GEAR.

1,253,294.   Specification of Letters Patent.   Patented Jan. 15, 1918.

Application filed April 19, 1917. Serial No. 163,142.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Gears, of which the following is a specification.

Figure 1:
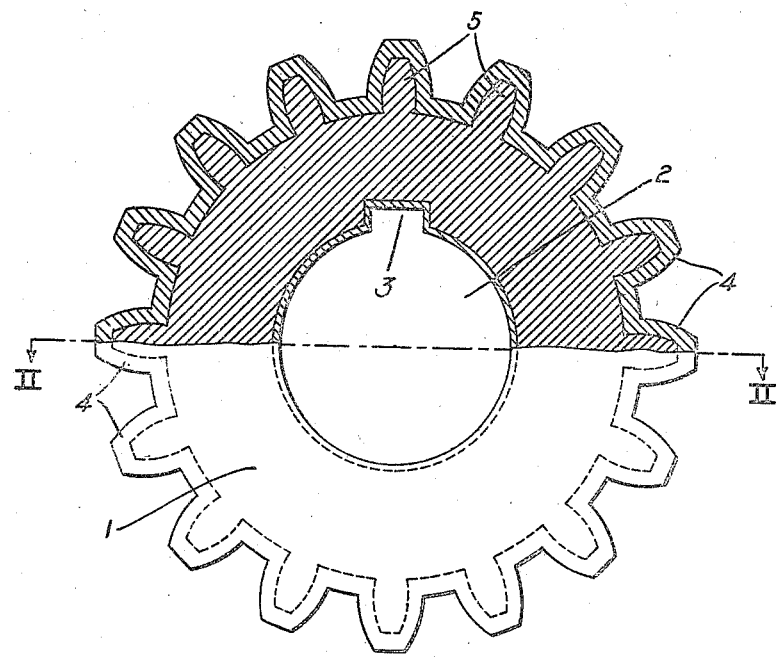
Figure 2:
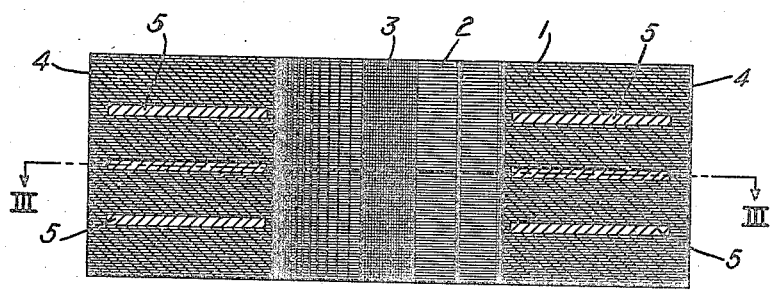

My invention relates to gears, pinions and other machine elements composed mainly of fibrous material and binders, and it has for its object to increase the mechanical strength of gears and other machine elements of the character indicated. In particular, it is my object to increase the tooth strength of non-metallic gear wheels and pinions by the use of reinforcements contained within the body of the pinion or gear wheel but not extending to the working faces of the gear teeth. An illustrative example of a spur gear wheel constructed in accordance with my invention is illustrated in the accompanying drawing, in which:

Figure 1 is a side elevational view of the gear wheel with parts broken away and shown in section, and Fig. 2 is a transverse sectional view of the gear wheel shown in Fig. 1.

The gear wheel shown in the drawing consists of a body portion 1 having a central opening 2, a keyway 3 and teeth 4, and is composed mainly of laminations of fibrous material associated with a suitable binder such as the synthetic resins produced by the condensation of phenols with formaldehyde. Gears made from this material are described and broadly claimed in the patents to Frank Conrad, Nos. 1,167,742 and 1,167,743, granted Jan. 11, 1916.

For the purpose of adding strength to the body portion and teeth of the gear wheel shown in the drawing, annular metallic reinforcing members 5 are disposed at suitable intervals within the gear wheel and preferably conform in shape to the gear teeth, as best shown in Fig. 1. It will be observed that the reinforcing members 5 do not extend to the outer or working surfaces of the gear teeth. By this construction, the teeth are reinforced without having their working surfaces interrupted by the edges of the reinforcement as has heretofore been the case in laminated gear which have included metallic laminations. Gear wheels and pinions constructed in accordance with my invention, therefore, have the same desirable properties as gears made according to the Conrad patents mentioned above, with respect to noiselessness in operation and resistance to abrasion and to the action of oil, water and other liquids.

The reinforcing members 5 may variously consist of punchings of steel, brass or other sheet metal, or may consist of wire netting or other metallic or non-metallic material capable of adding strength to the gear. I am aware that it has been proposed to provide non-metallic gears with reinforcing plates, but such plates have either extended to the working surfaces of the gear teeth or have not extended into the gear teeth at all. My present invention is designed to improve both of these forms of reinforced gears by effectively strengthening the gear teeth without changing the nature of the tooth surfaces.

The laminated construction described above may be modified by molding the gear from fibrous material such as long-fiber cotton associated with a binder, according to the process described and claimed in a copending application of Randal E. Talley, Serial No. 136,025, filed December 9, 1916, the reinforcing members being placed in the mold along with the molding material, and heat and pressure being applied to compact the assembled material into a solid mass.

If the gear or other machine element is composed of laminations of fabric treated with adhesive material, the product may be made by preparing a plate or block of stacked laminations of fabric containing a suitable number of reinforcing plates conforming in shape to the outline of the machine element, which is then cut from the non-metallic portion of the block adjacent to the reinforcing plates by ordinary machining methods; or the laminations of fabric may be first punched in the outline of the finished article, stacked with the desired number of reinforcing plates and associated with the desired adhesive material, and finally compacted into the shape of the finished article in a heated mold. It is to be understood that my invention includes gears, pinions and other machine elements made in accordance with the processes outlined above or in any other manner, and I do not desire to be restricted to the use of phenolic condensation products as adhesive materials, since other binders such as shellac, copal and other gums and gum-resins may be substituted for phenolic condensation products if desired. It is therefore to be understood that no limitations are to be imposed upon my invention except such as are indicated in the appended claims.

I claim as my invention:

1. A machine element comprising a non-metallic working body portion and reinforcing means inclosed within the said working body portion and conforming in shape thereto but not exposed at the working surface thereof.

2. A machine element comprising a non-metallic working body portion and a plurality of metallic reinforcing members inclosed wholly within the said working body portion and conforming in shape to the working surface thereof.

3. A machine element comprising a working body portion composed of fibrous material and a binder, and reinforcing means inclosed within the said working body portion and conforming in shape thereto, but not exposed at the working surface thereof.

4. A machine element comprising a working body portion composed of superposed laminations of fibrous material united by means of a binder and a plurality of flat metallic reinforcing members inclosed wholly within the said working body portion and conforming in outline to the working surface thereof.

5. A machine element comprising a working body portion composed of fibrous material and a phenolic condensation product and a plurality of flat, parallel, reinforcing plates inclosed wholly within the said working body portion and conforming in outline to the working surface thereof.

6. A gear comprising a toothed, non-metallic working body portion and reinforcing means disposed within the said working body portion and extending into the teeth of the gear, but not exposed at the working surfaces thereof.

7. A gear comprising a toothed, non-metallic working body portion and a plurality of flat reinforcing members disposed within the said working body portion and conforming in shape to the teeth of the gear but not exposed at the working surfaces thereof.

8. A gear comprising a toothed working body portion composed of fibrous material and a binder, and a plurality of reinforcing members disposed within the said working body portion and extending into the teeth of the gear but not exposed at the working surfaces thereof.

9. A gear comprising a toothed working body portion composed of superposed laminations of fibrous material and a binder and a plurality of flat metallic reinforcing members disposed within the said working body portion and extending into and conforming in outline to the teeth of the gear but not exposed at the surfaces thereof.

10. A gear comprising a toothed working body portion composed of fibrous material and a phenolic condensation product, and a plurality of reinforcing members disposed within the said working body portion and extending into and conforming in outline to the teeth of the gear but not exposed at the surfaces thereof.

11. A gear comprising a toothed working body portion composed of superposed laminations of fibrous material united by means of a binder comprising a phenolic condensation product, and a plurality of metallic reinforcing plates disposed within the said working body portion and conforming in outline to the teeth of the gear but not exposed at the surfaces thereof.

In testimony whereof, I have hereunto subscribed my name this 31st day of March, 1917.

CHARLES W. STARKER.